United States Patent Office 3,044,843
Patented July 17, 1962

3,044,843
FIBER DYEING PROCESS
Victor Tullio, Wilmington, Del., assignor to E. I. du Pont de Nemours and Company, Wilmington, Del., a corporation of Delaware
No Drawing. Filed May 13, 1959, Ser. No. 812,811
3 Claims. (Cl. 8—17)

This invention is directed to a novel process for improving fixation of dyes on certain textile fibers. In particular, this is concerned with the process of reacting a dye, a polyepoxy compound and a fiber whereby the dye is chemically bound to the fiber. This bonding is believed to be due to the chemical linking of the polyepoxy compound to both fiber and dye.

Before the discovery of the present invention, dyes have been "fixed" to fibers by after-treating the dyed fiber with various materials such as urea-formaldehyde reaction products. These known processes were effective in that the treating resin was deposited in and around the fibers and caused an enhanced entrapment of dye within the fibers of the fabric. These prior art fixation processes were applicable to fibers dyed with dyes having normal affinity for the substrate for which they were used; for example, substantive dyes on cotton.

It has now been discovered that dyes may be fixed to fibers by chemically reacting the dye with a polyepoxy compound and chemically reacting the polyepoxy compound with the fiber; the polyepoxy compound acting as a chemical link or bridge to bond the dye to the fiber substrate. One particular advantage of this novel process is that it permits fixation of dyes having no normal substantivity for the fiber substrate; for example, water soluble non-substantive dyes for cotton, may be fixed in this manner.

It is an object of the present invention to provide a novel process for fixing dyes to fibers containing reactive groups for linking the dye to the fiber. It is a further object of this invention to effect the chemical union of certain dyes and fibers containing specific reactive groups by linking said dye to said fiber with a polyepoxy compound as described. A still further object of this invention is to provide a process for fixing certain dyes to fibers which dyes would normally be ineffective to dye said fibers.

These and other objects will become apparent in the following description and claims.

More specifically, the present invention is directed to a process for dyeing textile fibers containing hydroxy, primary amino or secondary amino groups which process comprises the steps of impregnating said fibers with an aqueous system containing a polyepoxy compound and a water soluble dye containing basic primary or secondary amino groups in its molecule, and heating the treated fiber at 100° to 200°C. for about 0.5 to about 10 minutes in the presence of an acidic or basic catalyst.

The dyes useful in the process of this invitation are those water soluble dyes that contain a functional group reactive with epoxide compounds to be described. Most commonly, these dyes are acid or basic dyes containing basic primary or secondary amino groups. The examples which follow illustrate the types of dyes which may be used according to the present invention.

Operable dyes include acid dyes containing one or more sulfonic or carboxylic acid groups or their alkali metal salts and which dyes contain basic primary and/or secondary amino functions. These dyes will be selected from the group of azo, anthraquinone and phthalocyanine dyes. Other substituents may be present on the chromophore group or on the primary and secondary amino functions; the critical requirement is that the dye be water soluble (this water solubility resulting from the acid substituent) and that a function be present to react with epoxide groups (i.e., primary or secondary amino group).

Representative examples of azo dyes which fall in this class of acid dyes are:

(a) Victoria Violet 4BS:

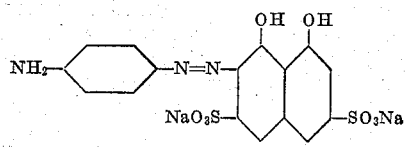

(b) Guinea Fast Red BL:

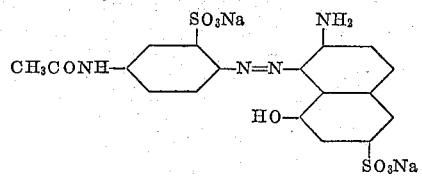

(c) Naphthol Blue Black B:

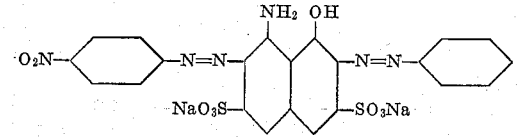

(d) The dye of the structure

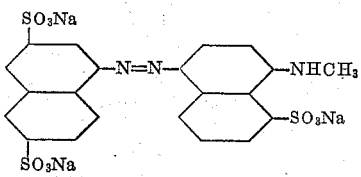

Other examples of specific representative azo dyes falling within this class of acid dyes are: Congo Red (C.I. 370), Benzopurpurin 4B (C.I. 448), Congo Orange (C.I. 415), Benzo Brown (C.I. 596), Diamine Black B (C.I. 395), Diamine Violet N (C.I. 394), Benzo Fast Pink 2BL (C.I. 353), Diamine Blue 2B (C.I. 406), and Plutoform Black (C.I. 545).

Examples of anthraquinone dyes which may be used according to this invention are:

(1)

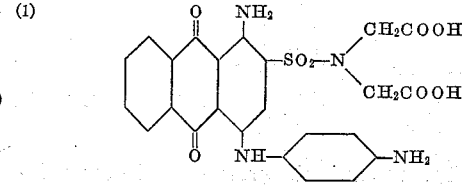

(2)

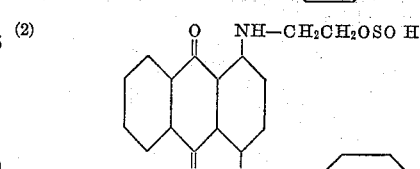

(3)

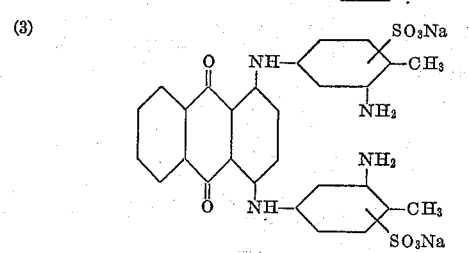

these and other water soluble anthraquinone dyes having primary or secondary amino groups reactive with epoxide compounds may be utilized.

Water soluble phthalocyanine dyes containing groups reactive with epoxide compounds are also useful in the novel process of this invention and are exemplified by the sulfonated phthalocyanines such as

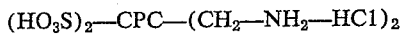

where CPC stands for copper phthalocyanine.

Useful basic dyes include those which are water soluble and contain primary and/or secondary amino functions. These dyes include the dye classes of triarylmethanes, cyanines, xanthines, oxazines, acridines, azines, and quaternary ammonium derivatives of azo, anthraquinone dyes, and the like.

Useful basic triarylmethane dyes are exemplified by fuchsine, Doebner's Violet, Soluble Blue (C.I. 707), and dyes of the following structures:

(a)
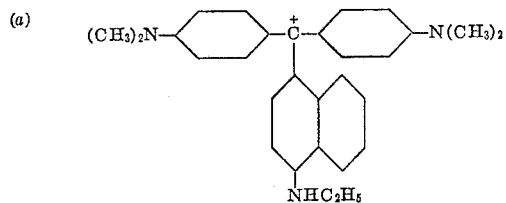

and
(b)
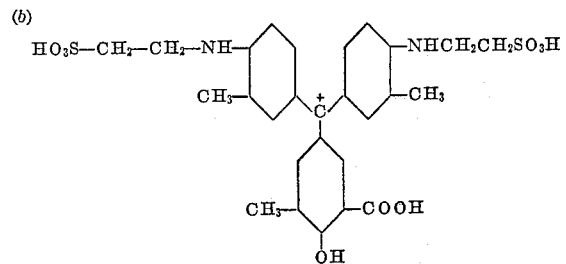

Examples of cyanine dyes operable according to this invention are:

(1)
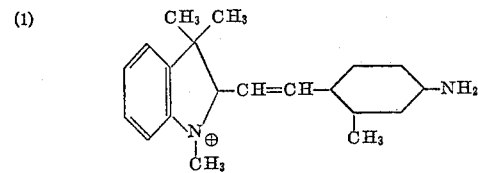

(2)
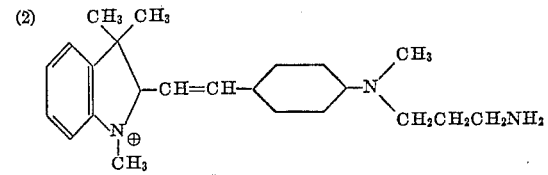

Xanthene dyes useful in the present novel process include the pyronines such as

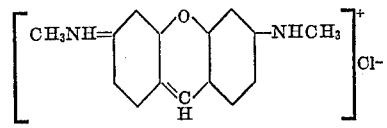

and
(b)
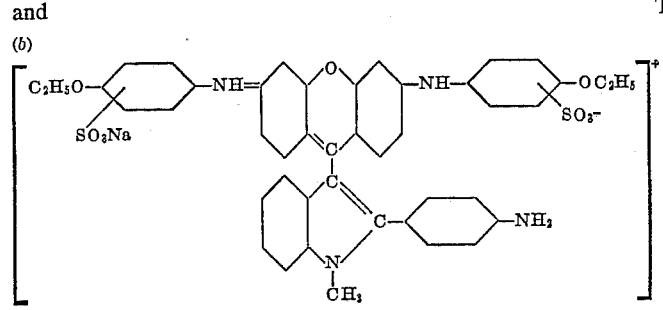

the sacchareins, succineins, and the rhodamines such as Rhodamine 5G, Violamine R and Rhodamine 3GO.

Examples of operable oxazine dyes are found in Nile Blue A of the structure (1)
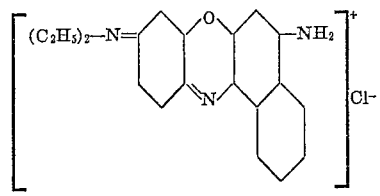

and the dye of the structure (2)
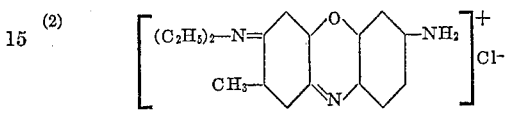

Acridine dyes useful in the present process include typaflavine, Acridine Yellow, Rheonine AL and the like.

The azine dyes which are operable include Mauve, Neutral Red, Safranine T, Wool Fast Blue BL and the like.

Quaternized azo and anthraquinone dyes useful in this novel process are exemplified by dyes of the following structures:

(a)
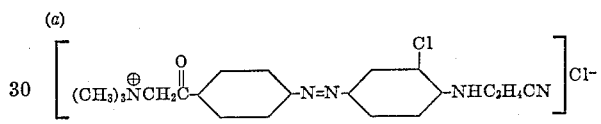

(b)
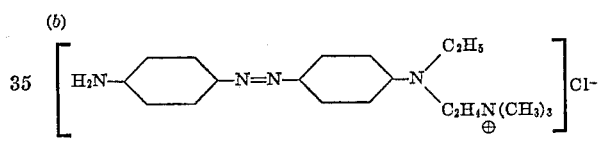

(c)
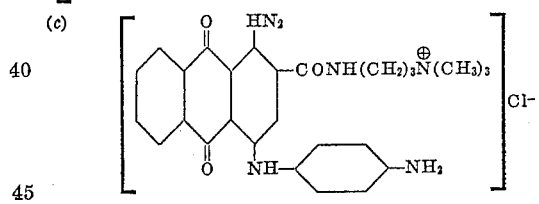

(d)
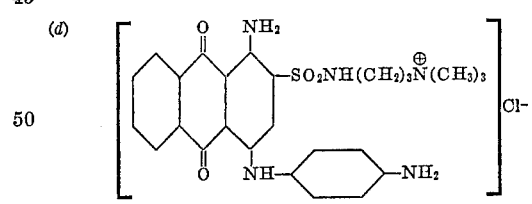

and
(e)
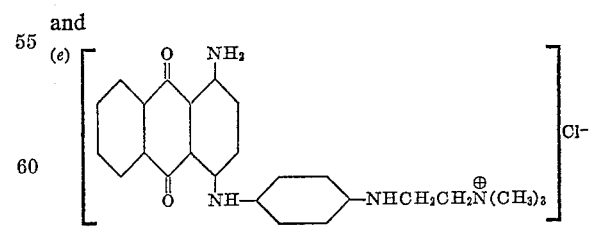

The preferred dyes for use according to the present invention are those of the described azo class containing a primary amine group.

The polyepoxy compounds which are operable in this invention are those compounds which have a plurality (i.e. more than one) of 1,2-epoxy groups

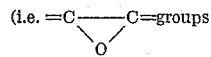

Such polyepoxy compounds may be saturated or unsaturated aliphatic, cycloaliphatic, aromatic or heterocyclic and may be substituted with non-interfering groups such as halogen, alkyl, alkoxy, etc. Because of their commercial availability polyepoxy compounds containing terminal epoxy groups

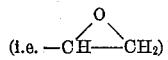

are preferred and these compounds and their preparation are disclosed in U.S. 2,864,804. Other useful polyepoxy compounds are those polyepoxides disclosed in U.S. Patents 2,854,461, 2,716,123, 2,745,847, 2,731,437, 2,786,067 and 2,848,426. Some specific compounds which exemplify these agents are the polyglycidyl ethers of sorbitol, the diglycidyl ether of 4,5-dihydroxy-2,7-naphthalene disulfonic acid disodium salt, diglycidyl ether, diglycidyl ether of ethylene glycol, diglycidyl ether of resorcinol, di- and triglycidyl ethers of glycerol, and polyglycidyl ethers of polyvinyl alcohol. Still other examples of useful polyepoxides are 1,4-bis(2,3-epoxypropoxy)benzene, 1,3 - bis(2,3 - epoxypropoxy)benzene, 4,4'-bis(2,3-epoxypropoxy)diphenyl ether, 1,3-bis(2,3-epoxypropoxy)octane, 1,4-bis(2,3-epoxypropoxy)cyclohexane, 4,4'-bis(2-hydroxy-3,4-epoxyburoxy)diphenyldimethylmethane, 1,3-bis(4,5 - epoxypentoxy) - 5 - chlorobenzene, 1,4 - bis(3,4-epoxybutoxy)2 - chlorocyclohexane and 1,2,3,4 - tetra(2-hydroxy-3,4-epoxybutoxy)butane.

Other operable examples include the glycidyl polyethers of polyhydric phenols obtained by reacting a polyhydric phenol with an excess, e.g., 4 to 8 mole excess of chlorohydrin, such as epichlorohydrin and dichlorohydrin. Thus a polyether, which is substantially 2,2-bis(2,3-epoxyporpoxyphenyl)propane, is obtained by reacting bisphenol(2,2-bis(4'-hydroxyphenyl)propane) with an excess of epichlorohydrin in an alkaline medium. Other polyhydric phenols that can be used in the present novel process include catechol, hydroquinone, methyl resorcinol, or polynuclear phenols, such as 2,2-bis(4-hydroxyphenyl) butane, 4,4'-dihydroxybenzophenone, bis(4-hydroxyphenyl)ethane, and 1,5-dihydroxynaphthalene.

The process of the present invention is applicable to substrates (such as textile fibers) which contain a functional group reactive with epoxide compounds. These functional groups will normally be hydroxyl or primary or secondary amine groups. Thus textiles which may be dyed by this process include cellulosic fibers such as cotton, linen and flax; regenerated cellulose, proteinaceous fibers such as wool and silk; and artificial fibers such as polyamide fibers (e.g. nylon, which contains amino end groups) and the like. In addition to treating textile fibers, this process can be used to treat paper.

The manner by which this novel process functions is in providing a chemical link between the water soluble dye and the fiber. During the process, one of the epoxide groups of the polyepoxy compound reacts with a reactive group on the dye and a second epoxide group reacts with the fiber. It will be understood that if more than two epoxide groups are present that these other epoxide groups will also be reactive with dye and fiber. Usually, the polyepoxide compounds used will contain up to six epoxy groups and the more epoxy groups present up to this number, the more efficient the process will be (i.e. greater fixation of dye in less time). Having more than six epoxy groups in the polyepoxide adds no material benefit. By means of this process a permanent chemical bond is established between the color chromophore and the fiber it colors.

The process of this invention is carried out in a manner conventional to textile and paper treating processes. The substrate is impregnated with an aqueous solution, dispersion or emulsion of dye and polyepoxy compound, and the impregnated textile then heated at about 100° to 200° C., in the presence of an acidic or basic catalyst, for about one-half to about ten minutes to effect the necessary reaction of epoxide group and described reactive group. It will be understood that at the higher temperatures, the shorter times will be used.

It will also be understood that some polyepoxides will be less reactive than others and may require somewhat longer heating times at the higher temperatures. Hindered polyepoxides (non-terminal polyepoxides such as limonene diepoxide) are examples that require these more severe conditions to effect fixation.

The impregnation step is usually conducted as a padding operation, although spraying and other techniques may be used. The aqueous bath may be a solution, dispersion or emulsion depending upon the solubility of the polyepoxy compound. If the polyepoxy compound is insoluble in water, a dispersing or emulsifying agent (such as a non-ionic dispersant) is useful to maintain the aqueous bath stable.

The amount of dye put on the fiber will be that required to give the shade desired. The amount of polyepoxy compound used will be at least stoichiometric with the dye taken; i.e. at least one mole of polyepoxy compound per mole of dye. Usually, the amount of polyepoxy compound used will be between two and twelve times the weight of the dye used. Preferably, the amount of polyepoxide compound will be five to ten times the weight of the dye component.

The reaction between an epoxy group and a hydroxy or amino group occurs readily, but a catalyst is required to ensure reaction in reasonable time between the epoxy groups and the reactive groups on the fiber and dye. The catalysts used may be any of the wide variety of acidic or basic catalysts used in the textile industry. Acid catalysts for example include citric acid, phosphoric acid, zinc fluoborate, zinc sulfate, aluminum sulfate, aluminum chloride, zinc chloride, ammonium fluoborate and the like. Basic catalysts include alkali metal hydroxides, carbonates, and bicarbonates, benzyltrimethylammonium hydroxide, choline, and the like. The preferred catalyst is zinc fluoborate. The catalyst is preferably added to the treating bath, but may be put on the impregnated substrate layer by a separate pad bath, by spraying or the like.

The heat treatment of the impregnated substrate is carried out at a temperature between about 100° and 200° C. for about one-half to ten minutes, the time varying inversely with the temperature as indicated.

A significant result achieved by the present invention is that the described dyes are chemically fixed to fibers; as a result of this fixation, a more washfast dyeing is obtained. This high degree of fixation is also advantageous in providing more economical and efficient use of the dye since in processes used heretofore much dye was lost while scouring the dye fabric. With the process of this invention, however, the dye is chemically bound to the fabric and this cannot be removed during laundering. Another significant advantage of this novel process is that dyes having no substantivity for fibers can be used effectively to dye the substrate; thus, many low cost water soluble dyes may now be chemically bound to cotton to provide exceedingly washfast dyeings at very low cost.

Representative examples illustrating the present invention follow.

*Example 1*

A pad bath is prepared from 30 parts of "Eponite" 100 (described by Shell Chemical Co. as a resinous diepoxide and believed to be the base catalyzed reaction product of glycerol and epichlorohydrin), 30 parts of a 5% by weight aqueous solution of a condensate of 10 moles of ethylene oxide with lauryl alcohol (to stabilize the dispersion), 2.5 parts of the water soluble dye obtained by coupling 7-amino-1,3-naphthalene disulfonic acid sodium salt with meta-toluidine, 5 parts of a 40% by weight aqueous solution of zinc fluoborate and 215 parts of water. Then, a piece of cotton broadcloth is padded with the dispersion, the treated fabric is squeezed of excess liquid and is finally heated at 150° C. for 5 minutes. The fabric is then boiled for 3 minutes with an aqueous solution containing 0.3% by weight of a non-ionic surfactant made by condensing about 10 moles of ethylene oxide with 1 mole of lauryl alcohol and 0.3% by weight of sodium carbonate. The fabric is dyed a yellow color (estimated fixation—60%) and is washfast as determined by the #3 A.A.T.C.C. wash test.

When the procedure is repeated except that the diepoxide is omitted from the pad bath, all of the color is removed by the washing procedure and the fabric is not dyed.

*Example 2*

A pad bath solution is prepared from 2.5 parts of the azo dye 7-amino-1,3-naphthalenedisulfonic acid sodium salt coupled to m-toluidine, 100 parts of a 12.5% aqueous solution of the water soluble fraction of the resinous diepoxide of Example 1, 5 parts of 40% aqueous zinc fluoborate, and 150 parts of water. Cotton broadcloth is padded with the solution, and the dye is fixed to the fabric by heating at 150° C. for 5 minutes. The fabric is scoured as described in Example 1. Analysis of the dyed fabric before and after scouring indicated that 55% of the dye is fixed. When the diepoxide resin is omitted and the experiment is carried out as above, no fixation of dye occurs.

*Example 3*

Example 1 is repeated except that the dye used is 1-amino - 4 - (4-aminophenylamino)anthraquinone-2-sulfonic acid. The fixation of dye obtained is excellent and the dyed fabric is fast to washing.

*Example 4*

When Example 2 is repeated except that the dye is a sulfonated phthalocyanine containing primary amino groups, the polyepoxide is the polyglycidyl ether of sorbitol and the catalyst is citric acid, and essentially the same results are obtained.

*Example 5*

Instead of using the polyepoxide and catalyst of Example 2, the diglycidyl ether of 4,5-dihydroxy-2,7-naphthalene disulfonic acid and sodium carbonate may be used to achieve essentially the same results.

The preceding examples are representative only as the described dyes and the described polyepoxides may be utilized to achieve substantially the same results as long as the required described functional groups necessary for the chemical reaction with epoxide groups are present on both the fiber and the dye.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A process for dyeing fibers, said fibers containing a functional group taken from the group consisting of hydroxy, primary amino, and secondary amino groups, which process comprises the steps of impregnating said fiber with an aqueous system containing a polyepoxy compound and a water soluble dye, said dye containing in the dye molecule an amino group taken from the group consisting of basic primary amino and secondary amino groups, followed by heating the impregnated fiber at a temperature within the range of 100° to 200° C. for from about 0.5 to about 10 minutes, in the presence of a catalyst, to chemically link said dye to said fiber.

2. A process as defined in claim 1 wherein said catalyst is an acidic catalyst.

3. A process as defined in claim 2 wherein said acidic catalyst is zinc fluoborate.

References Cited in the file of this patent

UNITED STATES PATENTS

| | | |
|---|---|---|
| 1,741,637 | Lilienfeld | Dec. 31, 1929 |
| 2,054,746 | Granacher | Sept. 15, 1936 |
| 2,131,120 | Schlack | Sept. 27, 1938 |
| 2,309,176 | Dreyfus | Jan. 26, 1943 |
| 2,741,532 | Guthrie | Apr. 10, 1956 |
| 2,940,817 | Browne | June 14, 1960 |

FOREIGN PATENTS

| | | |
|---|---|---|
| 696,282 | Great Britain | Aug. 26, 1953 |